Figure 1:
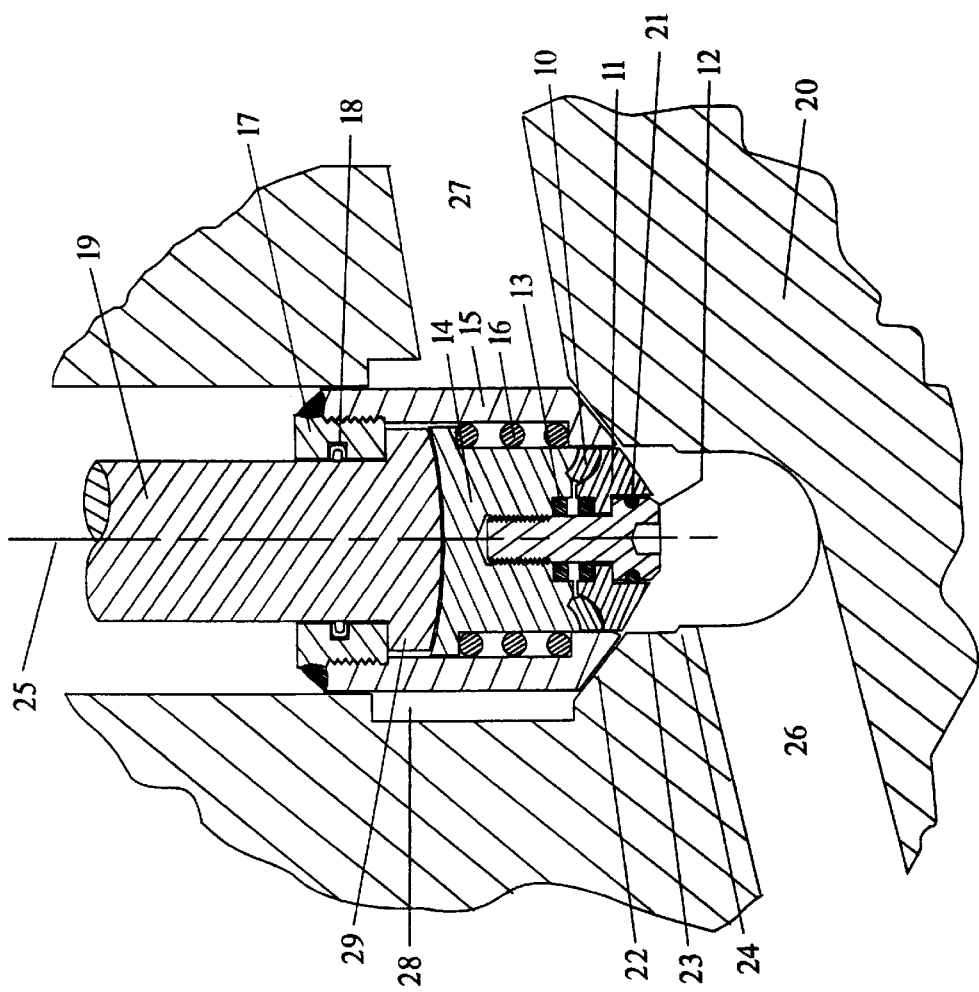

United States Patent
St. Germain

[11] Patent Number: 5,878,993
[45] Date of Patent: Mar. 9, 1999

[54] SHIELDED GLOBE VALVE SEAL MECHANISM

[76] Inventor: Stephen V. St. Germain, 422 Jerusalem Rd., Windham, Conn. 06280-1508

[21] Appl. No.: 824,638

[22] Filed: Mar. 27, 1997

[51] Int. Cl.[6] ....................................................... F16K 1/44
[52] U.S. Cl. ............................................ 251/210; 251/189
[58] Field of Search ..................................... 251/189, 210; 137/630.19

[56] References Cited

U.S. PATENT DOCUMENTS

| | | | |
|---|---|---|---|
| 2,676,781 | 4/1954 | Hobbs | 251/210 |
| 2,720,219 | 10/1955 | Grove et al. | 251/210 X |
| 2,830,620 | 4/1958 | Shuptrine | 251/210 X |
| 3,290,002 | 12/1966 | Self | 251/210 |
| 4,688,257 | 8/1987 | Cook et al. | 251/210 |

FOREIGN PATENT DOCUMENTS

| | | | |
|---|---|---|---|
| 596 796 | 4/1960 | Canada | 251/210 |
| 1133199 | 7/1962 | Germany | 251/210 |

*Primary Examiner*—John Fox

[57] ABSTRACT

A globe valve is which uniquely shields and effects sealing compression of a soft seal (10) such the valve can be used to control and fully stop flow of fluids of a variety of extremes of pressure, temperature, corrosive capacity and erosive capacity or combinations thereof that are known to destroy soft seals in current soft seal globe valves. The soft seal (10) is completely shielded within an upper (15) and a lower (11) hard seal assembly attached to the end of valve stem (19). Axial movement of valve stem (19) into valve control port (28) to close valve causes contact of conical hard seal surface of upper sheath hard seal (15) with matching upper conical sealing surface (22) of valve body (20) to greatly reduce fluid flow prior to protective lower hard seal (11) and soft seal (10) rings respectively sliding out of protective inner diameter of upper hard seal (15) sheath into equal diameter of valve cylindrical port (23). Further downward axial movement of valve stem (19) forces bottom of lower hard seal (11) to compress against essentially annular counter bore surface (24) near bottom of cylindrical port (23) against force of very stiff internal spring (13) to reduce cavity between lower hard seal (11) and attachment disc (14) rings which contain soft seal (10) causing elastic radial expansion of soft seal (10) into remaining annular flow path and against cylindrical sealing surface of the valve port to effect final bubble tight seal at final point of valve close. O-ring (28) around fastener (12) prevents fluid entrance to soft seal (10) inside diameter region (29) in order to prevent pressurization of inside of soft seal to allow pressure on outside of soft seal to force it back into cavity when cavity is redeveloped upon opening. Opening of valve occurs in reverse order of closing with soft seal (10) similarly shielded at all points of opening and when valve is used in partially raised position as used to restrict flow. The mechanism also provides a bubble tight seal to not only pressure in the passage above the disc but under the disc which is not achievable by other types of soft seal globe valves due to loss of sealing contact force due to stem deflection up under pressure. The unique manner in which the seal (10) is radially elastically expulsed against the cylindrical bore (23) of the valve in the final closing and initial opening motion of the stem (19) prevents sliding wear and minimizes plastic set of the seal (10) such that the valve is uniquely capable of a much higher number of open and close cycles without wearing to point of leakage than are current soft seal globe valve designs.

3 Claims, 3 Drawing Sheets

SHIELDED GLOBE VALVE SEAL SECTIONAL DETAIL
SHOWN IN POSITION OF FIRST CLOSING CONTACT

SHIELDED GLOBE VALVE SEAL SECTIONAL DETAIL
SHOWN IN POSITION OF FIRST CLOSING CONTACT

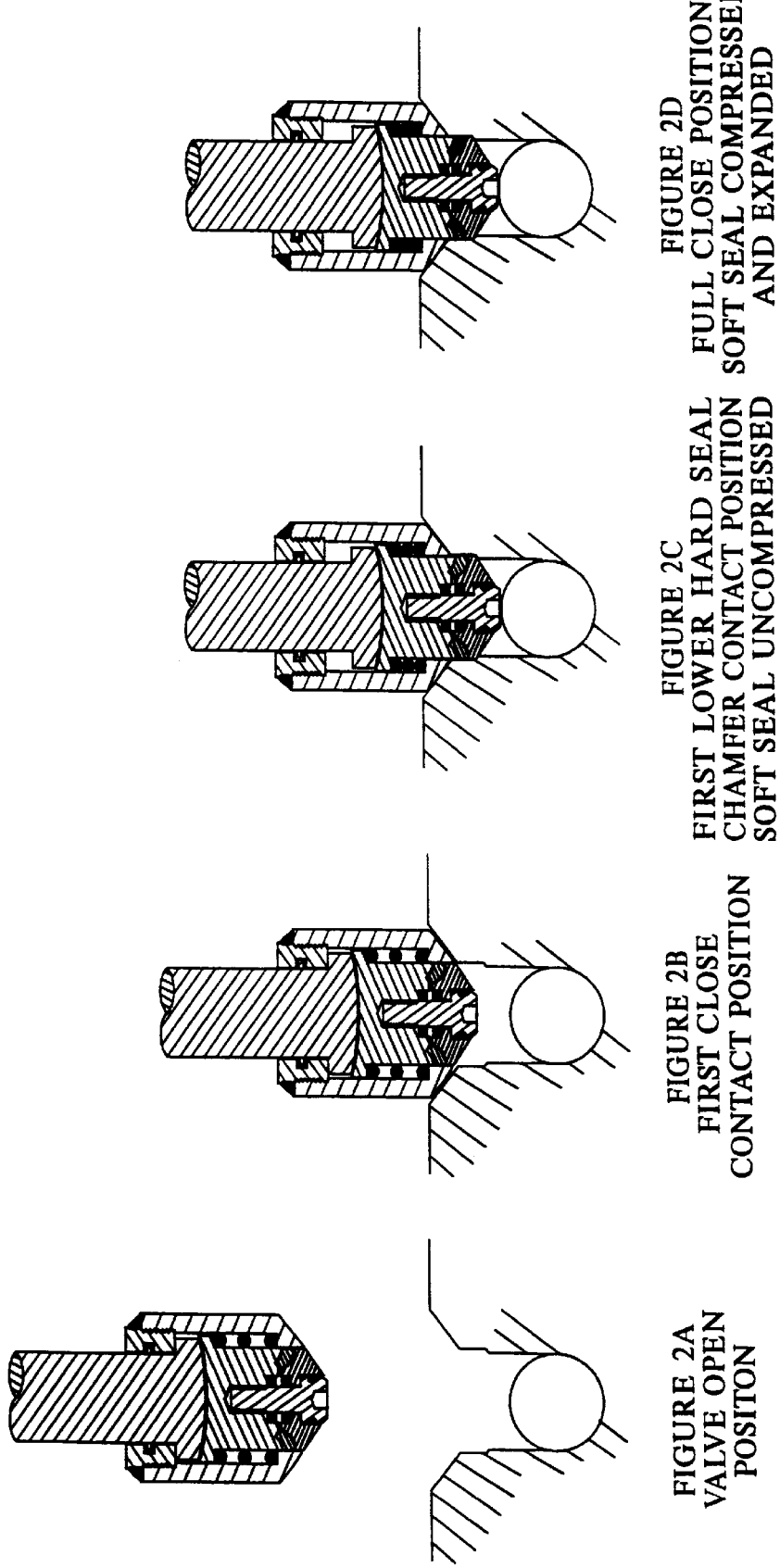

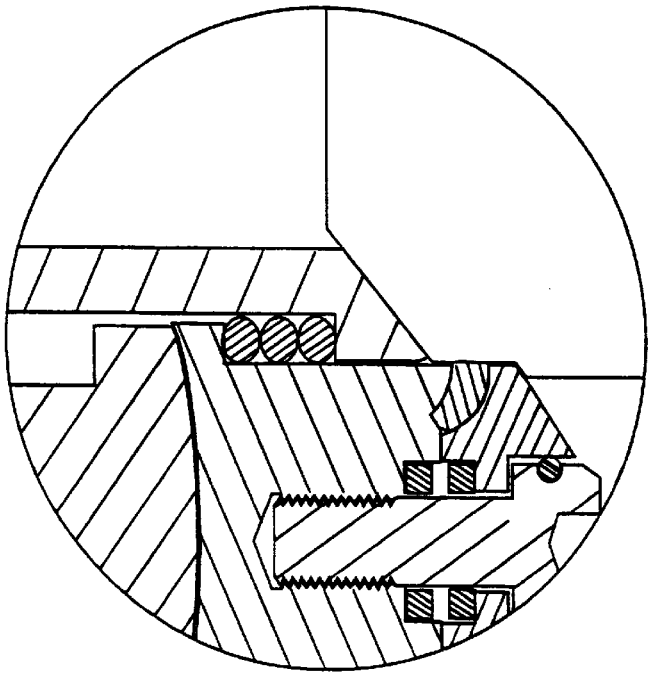
FIGURE 3A
LOWER HARD SEAL CONTACTING CHAMFER
SEAL UNCOMPRESSED
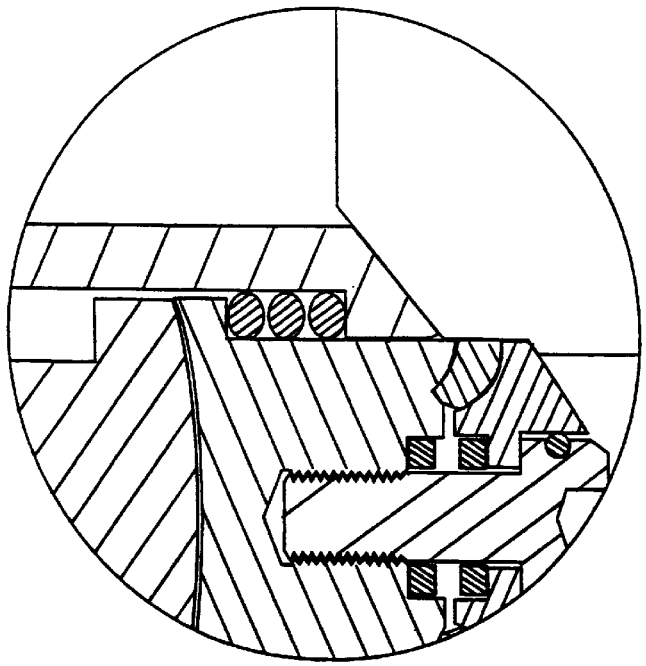
FIGURE 3B
FULLY CLOSED
SOFT SEAL COMPRESSED AND EXPANDED
AGAINST BORE, LOWER HARD SEAL CONTACTING DISC
FIGURE 3
MOTION OF SEAL IN FINAL CLOSE
FROM FIRST CONTACT OF RING ON CHAMFER
TO FULL COMPRESSION OF RING TO CONTACT
WITH DISC

SHIELDED GLOBE VALVE SEAL MECHANISM

TECHNICAL FIELD OF INVENTION

This invention relates to globe valves used for bubble-tight sealing at pressures to several thousand psi and where used for flow throttling where controlling clean as well as erosive and corrosive mixtures and some types or hot and cold mixtures which damage seals in current designs.

Background—Description of Prior Art

The use of valving to control fluid flow has many applications. One type of common line valve is the globe valve which is generally either the straight-line or Y-pattern type. In both designs there is an inlet passage, an outlet passage and a control stem passage containing the valve stem moveable within the body. The movable stem will typically have a sealing structure called a disc on the inner end which moves into sealing engagement with a portion of the valve body between ports to stop flow, and alternatively rises to fully open or partially open to restrict flow. Globe valves are generally of the metal seated or soft seated type.

A metal globe valve seat is generally a compression fit of the periphery of the disc in the valve body port affected by axial force of the stem. Metal seated globe valves are used for high temperature service which would melt or deform a soft seat or where a soft-seal would be damaged by contact with abrasive, corrosive or erosive types of fluid. Metal seated globe valves can leak due to noncompliance of the seal surfaces in areas of corrosion or erosion. Metal seated globe valves can wear by the streaming of fluid flow between the disc and the body seal surface if the valve is left nearly closed or if fully closed under high pressure with an existing minor leakage path. This wear occurs by the action of increasing fluid erosion of a minor leakage path to the point that the path is widened to a larger channel.

Soft seals are used in globe valves to provide improved seal compliance to surface irregularities and unevenness. Plastic globe valve seals are usually mounted on the end of the disc where highest flow velocity exists during valve closing and opening exposing the seal to damaging fluid flow forces, especially if the fluid is abrasive, erosive, corrosive or highly hot or cold. Size limitations prevent the seal assembly from being completely withdrawn from the flow stream area when the valve is fully open such that a soft seal will generally wear rapidly even if never used to slow flow by use in the partially closed position. Hot fluids soften plastic seals reducing seal resistance wear during opening and closing and leading to loss of resiliency and a tendency to deform or detach in the flow stream. Cold fluids embrittle soft seals also resulting in greater wear and possible cracking by the flow stream. Most current globe valve designs incorporating a soft seal shielding feature specify a preferred direction of flow in which the valve is to be used in order to prevent turbulence that would occur due to the obstruction of flow in the other direction by the sealing structure. In these designs, the sealing structure is not streamlined and acts to direct turbulent flow against the soft seal. A need exists for a soft seal globe stop valve which will completely shield the soft seal from contact with the high velocity flow stream during opening and closing such that the seal will not be damaged by the flow of abrasive, corrosive and erosive fluids and fluids of greater degrees of hot and cold so that these types of fluid can be sealed bubble tight. A further need exists for such a globe stop valve which will be streamlined to flow in either direction so that use of the valve will not be limited to flow in a single direction.

Globe valves are usually specified as either stop or control types because it is known that a globe valve left in a partly closed position in order to control flow will rapidly wear out to the point that it will not seal leak tight later on. This is a greater problem when the flow is abrasive, erosive or corrosive to the seal structure. Two globe valves are often used in series where both throttling and flow stoppage are required. A need exists for a reliable flow control globe valve which will be able to smoothly throttle and then stop flow of clean fluid as well as abrasive, erosive, corrosive and hot and cold types of fluid bubble tight, saving the cost and weight of a second valve. A further need exists for such a valve to be more streamlined to flow in either direction such that throttling control is smoother.

Soft seals in current globe valves typically wear out to the point of unacceptable leakage after several thousand opening and closing cycles due to wear caused by pinching and dragging of the seal between the disc and valve sealing surface during sealing. Current soft sealed globe valve designs do not have sufficient elastic compression to compensate for wear or to maintain sealing contact when the sealing surfaces are separated by high pressure under the disc. High and low temperatures increase the problem of soft seat leakage. At cold temperatures, soft seals can crack and abrade more rapidly, take greater plastic set, and loose resiliency. High temperatures can also reduce the abrasion resistance and resiliency of a plastic seal by softening of the plastic. A need exists for a globe valve soft seal which provides for a greater amount of elastic resiliency during sealing compression to prevent or reduce plastic seal compression, and to compensate for any sealing surface wear or misalignment. A need also exists for a soft seal which will not be dragged along or pinched by the valve sealing surface, but pushed against the sealing surface at the final point of close so that the seal will be able to open and close repeatedly with less wear.

Current globe valve designs of both metal seated and soft seated types are prone to leakage when high pressure is applied under the disc which forces the disc to separate from the sealing surface. Many high pressure globe valve designs specify a preferred direction of flow as that tending to pressurize the top of the disc to force it closed in order to avoid leaking due to pressure in the other direction. A need exists for a globe valve seal which will not leak when high pressure is applied underneath the disc.

Several designs of globe valves have been invented in order to solve some or all of the above described needs, however all designs reviewed are of limited improvement for reasons described below.

U.S. Pat. No. 4,688,757 to Cook et al (1986) discloses a soft seat globe valve seal intended to provide improved sealing of high pressure gas. The seal is always exposed to impingement of the fluid in the preferred direction shown in the patent. The patent specifies that the seal is effected by compression against a flat surface which is perpendicular to the axis of the stem and in which the stem travel is limited by compression of the metal disc member against the flat surface. The large flat sealing area obstructs flow in one direction so that the valve cannot be used effectively in the direction in which the hard seal structure would shield the soft seal. With Flow in the allowable direction will be obstructed by the hard seal which will direct turbulent flow against the soft seal resulting in greater soft seal wear. Soft seal wear would be worsened if the seal wear brittle due to the low temperature of throttled gas. Since the hard seal is not streamlined, it would also wear rapidly in many flow types.

Canadian patent 596,796 to Bryant (1960) employs an O-ring seal to seal in much the same way as Cook et al (1986) uses a plastic seal. In FIGS. 6 through 10 therein, the seal is pushed against a flat annular surface which is perpendicular to the axis of the stem and the stem motion is limited by forcing the disc structure against the metal flat. Also, like the Cook et al (1986) design, the seal is urged to wrap around the corner of the flat surface. Like the Cook design, the seal must be compressed against the flat surface and the disc structure for the most part. There must exist a space between it and the hard seal which cause it to be exposed to flow impingement. Also like the Cook design, the existence of the flat sealing surface causes high turbulent pressure drop in one direction limiting use to the other direction. Similarly again, flow in the preferred direction will be greatly impeded by the hard seal such that the hard seal will act to direct damaging fluid flow against the soft seal. The use of an O-ring to seal two pressurized seams as necessitated in this design is not recommended practice since it is difficult to achieve proper sealing of an with an O-ring in a cavity with two pressurized seams since it will be driven by pressure into only one seam at a time. O-rings must move in the sealing grooves to seal properly and this can allow accumulation of grit material in the groove which will cause leakage. The Bryant design requires the O-ring seal to be pinched between the flat sealing surface and the disc to a high degree in order for volummetric compression of the seal to effect compression of a relatively small part of the deformed O-ring below against the wall of the port below. FIG. 10 therein shows that any incremental movement of the disc into the port necessary to pinch the O-ring in the region above the port wall is accompanied by a large increase in cavity space adjacent to the port wall. In order to compress the O-ring against the wall of the port to effect a seal, the O-ring would have to be pinched very tightly on the flat corner above and deformed into the annulus below around a sharp corner. The sealing action which would tend to permanently set or damage any elastomeric O-ring with sufficient elasticity to seal in the described way. This design, like that of Cook et al. requires a flat surface directly obtuse to flow in ether direction which will cause high turbulence and tend to accelerate wear in the seal region further limiting usefulness of the design.

U.S. Pat. No. 3,290,002 to R. E. Self, (1966), discloses a soft seal globe valve design for flow control service. Like aforementioned Cook et al. and Bryant designs it also effects the seal by pinching a top region of a soft seal on a flat corner above the port causing elastic expulsion of the seal against the port wall below. Like the Cook et al. design, the seal would be prone to plastic set. The design is specifically intended for a Teflon seal. Teflon and other Fluoropolymer plastics are prone to extrusion into seams under pressure and otherwise prone to permanent plastic set. Fluoropolymer plastic materials have little resiliency. The Self design necessitates a cylindrically shaped Teflon seal which is highly pinched on a protruding corner and partially extruded into a small annulus below. The seal would have little capability of recovering to the original cylindrical shape in order to retract into the shield and would become rapidly damaged. Further, the design does not describe any means of assisting the restoration of the seal by pulling it back by a spring loaded shield or similar functioning structure, but rather relies on the resiliency of the Teflon itself to retract into the shield when the valve is opened.

U.S. Pat. No. 2,720,219 to Grove (1955) and copending application (1948) disclosed a globe valve soft seal design intended to provide solutions to all of the above described needs. The design necessitates the use of O-ring soft seals. The O-rings must slip over a pressurized seam during opening and closing. This usage of O-rings is specifically warned against in O-ring manufacturer literature due to the recognized problem of O-rings becoming quickly damaged if driven into a pressurized seam while being forced axially along it.

U.S. Pat. No. 2,676,781 to Hobbs discloses a non-shielded globe valve seal which effects sealing by compression of a soft seal against a cylindrical surface of the valve port by compressing it above a metal ring which first bottoms in a counterbore in the port. The design employs a spring, piece 65, which is expressly intended to force the seal out against the wall of the port at all times and to compliment the seal compression against the valve cylindrical bore at all points of stem movement. The use of the spring will cause the seal to firmly slide along the cylindrical sealing surface until the point of final close such that it will be subject to high wear. Since the spring is specifically intended to force the seal against the port wall, it cannot serve any function to restore the seal to it's original shape upon seal decompression during opening of the valve. Also, the design provides no means of shielding the seal from flow.

U.S. Pat. No. 2,830,620 to Shuptrine (1958), discloses a non-shielded globe valve seal arrangement in which, during closing, a hard seal first makes contact with a counterbore in the port and in which an exposed soft seal subsequently is compressed against a flat surface protruding into the flow stream. Since the soft seal is immediately adjacent to the hard seal when the hard seal is near first contact, the seal will be exposed to extreme fluid flow force tending to dislodge and damage it. At all points of valve close, the seal is largely unshielded. The soft seal as shown would quickly wear if used for any type of flow control. Pressure under the disc would act to push it away from the sealing surface, reducing the compressive sealing force of the soft seal in between. Although the design provides for a spring loaded hard seal to make first contact, the function is similar to that of a conventional fixed globe valve disc fitted with a slightly longer disc length to engage the bore prior to the soft seal seating.

German patent DAS 1133199 to Ausgabetag (1962) discloses a vaned flow control type globe valve with a non-shielded soft seal which is compressed against a protruding flat surface in the flow stream following initial contact of a metal seal below it. Like the aforementioned Cook, Bryant, Self and Shuptine designs, this design effects a seal by pinching the soft seal ring against the corner of a flat surface which protrudes into the flow stream, rather than by expulsion against the cylindrical port wall. Like the above mentioned designs, the valve necessitates a non-streamlined, flat, annular surface projecting into the flow stream which would cause significant turbulence and tend to accelerate soft seal wear. Also, similar to above mentioned patents, the seal must undergo an extreme degree of deformation to effect the seal with little capability of recovering to the degree necessary to provide sufficient sealing resiliency or to resist wear. Also like the Cook, Bryant, Self and Shuptine designs, pressure under the disc would tend to separate the soft seal from the sealing surface causing leakage. Any leakage path through the hard seal allowing pressure beneath the disc to accumulate under the O-ring would tend to dislodge it.

In summary, of the seven patent cited, four provide for a degree of shielding of the valve seal within a sleeve or relatively sliding shield. Three of the four function by pinching the soft seal onto a flat surface projecting into the flow stream in order to force a portion of the soft seal into an annulus below between the disc and the valve port. The limitations of these three designs are mostly due to this required action. The other shielded soft seal design is greatly limited because it necessitates use of O-rings which must be force axially over a pressurized seam. None of the designs provide for a soft seal and cavity shape which allows for the seal to properly recover the uncompressed shape when the valve is opened. Only the Hobbs design effects sealing by forcing the seal completely against the port wall. This seal would be capable of containing high pressure under the disc, however the other benefits of such sealing method are not recognized by the design. The seal is always unshielded, the port is not streamlined and the seal is always forced out against the wall while sliding to the closed position accelerating seal wear.

OBJECTS AND ADVANTAGES

Accordingly, the objects and advantages of the presently disclosed patent are:

(a) to provide an improved leak-tight fluid sealing globe valve for passage of abrasive, erosive and corrosive fluids and fluids of greater degrees of hot and cold flowing in a single direction.

(b) to provide an improved leak-tight fluid sealing globe valve for conditions of (a) above which is streamlined such that the flow can easily pass in either direction rather than a single direction.

(c) to provide an improved globe valve which can act as a reliable stop valve after prolonged use in the partially closed position to throttle flow in order that a second valve for throttling is not necessary.

(d) to provide an improved globe valve with increased capability of the soft seal to elastically conform to irregularities and misalignment of the mating metal sealing surface and to resist plastic set in order to improve sealing of the valve.

(e) to provide an improved globe valve which can be opened and closed repeatedly a greater number of times without the seal becoming damaged due to pinching and dragging.

(f) to provide an improved leak-tight fluid sealing globe valve which can seal very high pressure accumulated under the disc rather than just with pressure accumulated on top of the disc in a direction tending to force the disc and seal closed.

DESCRIPTION FIGS. 1 to 3

With reference to the drawings wherein reference numerals designate like or corresponding parts throughout the several views, and in particular to FIG. 1, there is shown a globe valve forming a first embodiment of the globe valve. The valve includes a body 20 defining a lower passage 26, an upper passage 27 and a flow control passage 28 which interconnects passage 26 and 27. A valve stem 19 is illustrated within the passage 28 and is moveable along stem axis 25 from full open position shown in FIG. 2A to permit fluid flow through the passages, to the closed position shown in FIG. 2D, to block flow between the passages. Movement of stem 19 along axis 25 is controlled by conventional threaded connection structure which moves it in either direction by rotation of a valve handle. As this structure is conventional, it is not shown or described further.

Valve body 20 defines three separate surfaces below and concentric with the bottom of flow control passage 28. The surfaces are; a conical upper hard seal surface 22 which is above and ends on a cylindrical bore surface 23 which ends above a slightly conical shaped lower hard seal sealing surface 24 leading to the lower passage 26.

Valve stem 19 defines a structure on the lower end comprised of a cylindrical collar region 29 above a cylindrical disc 14. Collar 29 is a cylindrical region integral to end of stem 19 of greater diameter and concentric to the diameter of shank of stem 19 above. Disc 14 is a cylindrical piece comprised of an upper collar of equal diameter to the stem collar and a larger, lower region of diameter of generally equal to that of the stem 19 in region above the stem collar 29. Collar 29 provides a means of attachment of hard seals 15 and 11, soft seal 10, and attached structure as described hereinafter.

Cylindrical metal sheath hard seal 15 is mounted on disc 14 by threadable attachment to attachment nut 17 above stem collar 29. Sheath hard seal 15 defines a through interior of two cylindrical inside surfaces both concentric with a cylindrical exterior surface. The exterior surface is conically tapered at the bottom meeting the outer edge of the lower inside cylindrical surface. The conical region is the hard seal sealing surface of sheath 15 and is similarly shaped to the conically concave upper hard seal surface 22 at top of cylindrical bore 23 in valve body 20. The upper inside cylindrical surface of sheath 15 ends on the smaller inside cylindrical region at an internal annular surface which is orthogonal to the cylindrical axis and is located slightly above the top edge of conical taper on the outside cylindrical surface. The diameter of the upper inside cylindrical surface is slightly larger than the diameter of stem collar 29 for a loose sliding fit within it. The upper region of the larger inside diameter is threaded for attachment of external mating thread on attachment nut 17.

Attachment nut 17 is cylindrically threaded on outer surface and defines an inside cylindrical surface slightly greater in diameter than region of stem above the collar to allow stem sliding within it. Attachment nut 17 defines a cylindrical concentric groove near the middle of the inside cylindrical surface to closely contain scraper seal 18.

The diameter of the upper inside cylindrical surface of sheath 15 is slightly larger than the outside diameter of helical spring 16 contained in it. When assembled, spring 16 is contained and compressed in sheath 15 between the inside annular surface and the lower annular surface of attachment nut 17.

The bottom of disc 14 defines a contoured surface similar to the lower inner quadrant of a toroid shape to match the equally shaped but outwardly opposite upper surface of soft seal 10. The bottom surface of disc 14 also defines a threaded blind hole concentric with stem axis 25 in which threaded fastener 12 is installed. The bottom surface of disc 14 also defines a flat bottomed cylindrical surface concentric to the threaded blind hole to contain the upper portion of lower hard seal spring 13. Soft seal 10 and lower hard seal spring 13 are retained between lower hard seal ring 11 and end of disc 14 by fastener 12 when assembled.

Soft seal 10 is plastic or elastomeric ring with a cylindrical outside surface of slightly greater diameter than cylindrical sealing surface 23 in valve body 20. Soft seal 10 in the preferred embodiment is 25 percent carbon filled modified Teflon material. Seal 10 is shaped like the lower inner quadrant of a toroid except that the thickness is slightly less towards the inside of the ring when viewed in cross section tangential to the main axis. The inner face of soft seal 10 is concentric with its outer cylindrical surface and slightly conically tapered upwardly outward. The upper corner of the inside surface of seal 10 is chamfered at a greater upwardly outward included angle than the cylindrical inside surface below to provide an annular conical face which is generally perpendicular to the circular centerline of the tangential cross section. Disc 14 is contoured to closely match the upper conical flat face and the upper curved face of soft seal 10. Soft seal 10 is slightly wider in the axial thickness than the cavity when measured in axial thickness near the outside surface, with a transition to no thickness difference towards the inner diameter. At assembly, of fastener 12 is installed against spring force to proper distance such that there exists a slight interference fit between it and the similarly contoured surfaces of the cavity near the outside surface to preclude fluid flow to the inside of the seal 10.

Lower hard seal 11 is cylindrical with a slightly smaller diameter than the internal cylindrical surface 23 of the body port for a sliding fit within it. The ring 11 has an upper surface similar to but outwardly opposite the lower curved surface of soft seal 10. As assembled, soft seal 10 is closely contained within an equally shaped cavity between disc 14 and lower hard seal 11. The lower surface of lower hard seal 11 is slightly conically shaped to the same angle as the lower conical port sealing surface 24. The top surface of hard seal 11 defines a cylindrical flat bottomed recess concentric with the outside cylindrical surface to loosely fit the outside cylindrical surface of machined spring 13. The lower surface of hard seal 11 also defines a flat bottomed cylindrical recess concentric to the outside surface to loosely fit the cylindrical surface of the head of the lower hard seal fastener 12 and to recess it. The cylindrical surface of the head of fastener 12 defines a groove to closely fit O-ring seal 21 within surface of lower cylindrical recess in disc 14.

Lower hard seal spring 13 is a machined spring. Machined springs are much stiffer than either helical or belvill type springs of similar overall size. The outside diameter of spring 13 is slightly less than the equal diameters of the cylindrical recesses in disc 14 and the top of the lower hard seal 11 for a loose fit in both. The diameter of the inside cylindrical surface of machined spring 13 is slightly greater than that of the shank of fastener 14 for a loose sliding fit about it. Machined spring 13 is a non-helical type constructed by machining alternating slots in a metal cylinder. A typical shape of this spring is four slots per ring layer, each separated by a small amount of remaining metal. The slots in each layer are rotated 45 degrees relative to the next axially adjacent layer providing consecutive compressive rings cantering about the remaining material separating them. The ring sections may be separate pieces or connected depending on desired stiffness. In any form, machined spring 13 is sized to provide a stiff compression force separating lower hard seal ring 11 from disc 14 when captivated between by fastener 12.

DRAWING FIGURES

FIGS. 1 is a cross sectional view forming a first embodiment of the present invention at the position of close or open where the sheath hard seal contact the upper hard seal surface and the inner assembly is fully retracted.

FIG. 2 is a series of cross sectional views of the valve showing operation from open to closed. FIG. 2-A shows the valve open. FIG. 2-B shows the valve at point of close where the sheath hard seal first contacts the upper hard seal conical surface. FIG. 2-C shows the valve when further closed to the point where the lower hard seal first contacts the lower hard seal surface in the valve body bore. FIG. 2-D shows the valve in the closed position.

FIG. 3 is two enlarged partial cross sectional views of the sealing areas of the globe valve when it is in the positions shown in FIGS. 2C and 2D respectively. FIG. 3-A shows the lower hard seal in first contact with lower hard seal chamfer in port to limit flow. FIG. 3-B shows soft seal fully expulsed against the cylindrical bore of the valve port following final downward motion of the valve stem to close.

REFERENCE NUMERALS IN DRAWINGS

| 10 | soft seal | 11 | lower hard seal |
|----|-----------|----|-----------------|
| 12 | fastener | 13 | lower hard seal spring |
| 14 | disc | 15 | sheath hard seal |
| 16 | sheath spring | 17 | attachment nut |
| 18 | scraper seal | 19 | stem |
| 20 | globe valve body | 21 | O-ring |
| 22 | upper hard seal surface | 23 | cylindrical bore |
| 24 | lower hard seal surface | 25 | stem axis |
| 26 | lower passage | 27 | upper passage |
| 28 | flow control passage | 29 | stem collar |

OPERATION—FIGS. 1 to 3

A typical embodiment of the disclosed valve is shown in FIG. 1. Several unique functional attributes of the design will enable it to perform better than currently used globe valves. FIG. 2 provides a pictorial overview of the operational sequence of the valve as described as follows and FIG. 3 provides a detailed magnified view of the seal assembly at point of final expansion of the soft seal 10.

FIGS. 2A to 2B show the valve from full open to point of first contact of sheath hard seal 15 with valve body upper hard seal surface 22. During this motion, the valve increasingly reduces fluid flow until almost completely stopped. At all portions between full open and first sealing contact of the sheath hard seal 15, valve may be set to provide a controlled restriction to flow in either direction. Unlike conventional throttle type globe control valves, soft seal 10 is completely shielded from impingement of the fluid when so positioned to restrict flow.

FIG. 2B shows first contact of sheath hard seal 15 with valve body upper seal surface 22. Further axial movement of stem 10 to close valve causes disc 14, soft seal 10 and lower hard seal ring 11 sliding expulsion from sheath 15 into equally sized cylindrical bore 23 below. The lower corners of both sheath hard seal 15 and upper hard seal surface 22 are slightly radiused to prevent soft seal 10 from catching on either corner when first slipping over the seam during valve closing or opening. Further motion of stem 19 to closed position slides disc 14, soft seal 10 and hard seal 11 through sliding engagement with bore 23 until first contact of lower hard seal 11 with lower hard seal surface 24 in valve body 20 as shown in FIG. 2-C. During motion of disc 14, seal 10 and seal ring 11 from positions shown in FIG. 2-B to 2-C high volume of flow is prevented from passing through the annulus between the parts and the cylindrical bore 23 since the flow is restricted by the partly engaged sealing surface of sheath 15 on the upper hard seal surface 22 and by the small annular passage remaining between lower hard seal ring 11 and the cylindrical bore 23. Pressure may develop on either side of the disc depending on flow direction. In either direction sheath hard seal 15 will prevent fluid impingement on soft seal 10 when it is wiped into the valve body bore. Soft seal 10 is slightly greater in outer diameter than the inside diameter of the cylindrical bore 23 prior to final expansion to effect seal. Soft seal 10 is sized to wipe the cylindrical bore 23 on either edge during sliding motion within it to preclude pinching of abrasive particles between the two surfaces which would damage soft seal 10.

Final valve closure occurs from position of first contact of lower hard seal ring 11 with lower hard seal surface 24 as shown in FIG. 2C to the position shown in FIG. 2-D where valve disc 14 is forced against hard seal ring 11 causing elastic expulsion of the seal 10 against bore 23. FIGS. 3A and 3B show magnified views of FIGS. 2C and 2D. While undergoing this step, soft seal 10 is further compressed in the decreasing cavity space between the disc 14 and the hard seal ring 11 causing it to be twisted and expanded against the cylindrical bore 23 creating a bubble tight seal. FIGS. 3A and 3B show how the conically tapered upper inner corner of the soft seal is pushed against by the similarly shaped groove in disc 14 to twist the soft seal 10 out of the decreasing cavity. Soft seal 10 is expulsed against the cylindrical bore 23 to a highly compressed state after lower ring 11 becomes stationary preventing sliding forces that would otherwise pinch and tear seal 10 during stem movement.

Valve opening is the reverse of steps shown in FIGS. 2A through 2D. Lower hard seal spring 13 acts to separate lower hard seal ring 11 from disc 14 during first upward stem movement acting to reestablish the cavity space for soft seal 10 between disc 14 and lower hard seal 11. Soft seal 10 elastic contracts from twisted and expanded position into the redeveloping cavity. Relaxation of compression force of soft seal 10 against bore 23 during opening allows low velocity fluid pressure to develop against the outer surface of soft seal 10 which acts to assist its retraction into the redeveloping cavity space. O-ring seal 30 prevents pressure under the disc from entering the cavity on the inside of the soft seal 10 so that it will not be prevented from retracting into the cavity by pressure behind it. Although O-ring 30 will leak any existing pressure under the disc into the space within inside of soft seal 10 over a prolonged time; during the relatively short duration of valve opening, the cavity will expand much more quickly than the O-ring 30 can leak fluid pressure in to replace it such that the pressure on the inside of the soft seal 30 will be much less than the pressure on the outer sealing surface. During opening motion from positions shown in FIG. 2D through 2B respectively, sheath hard seal remains firmly seated against upper hard seal surface 24 preventing high velocity fluid flow through the annulus between outside diameter of the soft seal 10 face and cylindrical bore 23. High flow velocity past soft seal 10 could cause low pressure by bernoulli affect which could otherwise prevent retraction of seal 10 into cavity.

Attachment nut 17 contains a scraper seal 18 which allows only clean fluid to draw in and expulse out from cavity within the sheath hard seal 15 to binding due to accumulated grit.

Deflection of the disc 14 and stem 19 assembly upward due to the existence of high pressure in the lower passage 26 will not push soft seal 10 away from sealing contact with the sealing surface 23 but only slide it slightly upward. Upon valve opening compressive force of spring 16 readily force sheath 15 to slide back over soft seal 10 with no binding or pressure lock.

SUMMARY, RAMIFICATIONS, AND SCOPE

Accordingly, the above described globe valve design provides improved sealing performance over various operating conditions which cause leakage in current designs. The valve can throttle and subsequently stop bubble tight extremely abrasive, erosive and corrosive types of fluid because the seal is completely shielded form exposure to the flow prior to the final point of sealing. The soft seal will retain resiliency and sealing capability over a greater number of closing and opening cycles as compared to current soft seated globe valves designs because it will not slide over the sealing surface prior to final compression. The globe valve will be capable of completely sealing much higher pressure under the disc than current designs because the soft seal effects compression against the cylindrical port of the valve. The valve will function as both a throttle valve and a reliable stop valve in services that currently require a separate valve for each use. The globe valve is smaller than current throttle type globe valves while providing the additional benefit of much improved sealing capability.

Although the description above contains many specificities, these should not be construed as limiting the scope of the invention but as merely providing illustrations of the presently preferred embodiment of the invention. For example a guide pin could be installed on the collar of the stem to prevent pressure from deflecting shield up yet allowing rotation of stem within sheath upon sheath contact with body to force seal assembly out of sheath against the spring force. Also, for example, disc 14 could be integral with valve stem and the spring 16 could be constructed with end tabs if torsional resistance to movement of sheath 15 upward on stem 19 were necessary to further resist deflection of shield upward by pressure from underneath it. Also, for example, a flexible bond glue could be used to adhere the soft seal 10 to either or both the adjacent surfaces on the disc 14 and the lower hard seal to prevent fluid passage into the cavity behind the seal yet provide sufficient resiliency to allow necessary relative movement during seal expulsion and retraction. Thus the scope of the subject invention should be determined by the appended claims and their legal equivalents, rather than by the examples given.

I claim:

1. A valve for controlling fluid flow, the valve having a body and a valve stem for movement between an opened position permitting fluid flow through the valve and a closed position blocking fluid flow through the valve, the stem moving along a first axis comprising;

an axially cylindrical seal assembly comprised of a soft seal assembly within an outwardly and inwardly cylindrical shield assembly;

the inner assembly comprised of two metal rings separated by a stiff spring and containing the soft seal between in an equally shaped cavity, all attached by a threaded fastener;

the shield assembly comprised of an outwardly and inwardly cylindrical shield which closely fits the cylindrical surface of the inner assembly and which contains a spring which forces the shield downward over the inner assembly prior to valve closing;

the valve port comprised of a series of three seal surfaces defined on the valve body concentric with the first axis and surrounding the fluid passage through the valve, one conical shaped at top of port, one cylindrical shaped within port and another conical shaped at bottom of port;

the combined assembly designed such that the inner assembly is pushed out of close fit within cylindrical shield against force of integral helical spring and into closely fitting lower cylindrical bore whereupon the inner assembly is pushed against a small counterbore region at bottom of bore causing axial compression of the soft seal assembly against the force of highly stiff machined spring within inner assembly causing a decrease of cavity space for soft seal in between and radial expulsion of soft seal against cylindrical bore sealing surface effecting bubble tight seal;

an O-ring installed between the head of the fastener of the inner assembly and the lower metal ring such that fluid pressure cannot build up behind the soft seal such that whereupon upward motion of the valve stem to open the valve the two metal rings are separated by the force of the intermediary spring allowing retraction of the soft seal back into a similarly shaped and redeveloping cavity axially intermediate in soft seal assembly by the combined force of the elastic resilience of the seal material itself and fluid pressure against the outside surface of the relaxed seal.

2. The inner sealing assembly of claim 1 wherein the inner sealing assembly is comprised of;

a plastic or elastomeric material soft seal with a cylindrical outside diameter only slightly greater than said cylindrical sealing region on body and shaped generally like the inner lower quadrant of a toroid to mate to similar cavity formed between surfaces on stem disc structure and lower hard seal ring on upper and lower surfaces respectively;

a generally cylindrical shaped lower hard seal ring of outside diameter slightly less than cylindrical sealing diameter of the body port with an upper surface contoured in the shape of the inner lower quadrant of a toroid, a lower surface slightly conical shaped with a similar profile to that of the said lower conical port sealing surface and with a cylindrical flat bottomed recess on both top and bottom surfaces concentric with a through hole through center of lower hard seal ring;

an integral disc structure defined on the valve stem end internal to the valve having a collar region of larger diameter than the stem and a slightly greater diameter than stem below collar with a contour on the end below the said collar shaped generally like the inside of the lower quadrant of a toroid, with a threaded blind hole concentric with stem axis on same end with a cylindrical, flat bottomed recess also concentric on same end about threaded hole to accommodate a threaded fastener;

a machined type spring of outside diameter generally equal to that of said cylindrical recess in the top of lower hard seal ring which is concentric to said through hole in lower hard seal ring;

a threaded fastener which attaches lower hard seal ring to disc with machined spring and soft seal retained in between;

a plastic or elastomeric o-ring type seal contained within a groove between the threaded fastener and the lower hard seal ring recess for it to prevent fluid pressure from developing behind the seal.

3. The valve of claim 1 for combined throttling and stopping control of various types of fluid flow including caustic, hot, cold and abrasive up to several thousand psi in either direction.

* * * * *